(No Model.) 2 Sheets—Sheet 1.

E. THOMSON.
ELECTRO MAGNETIC MOTOR.

No. 345,334. Patented July 13, 1886.

ATTEST:
J. Murdle
Wm. H. Capel

INVENTOR:
E. Thomson
by H. C. Townsend
Atty

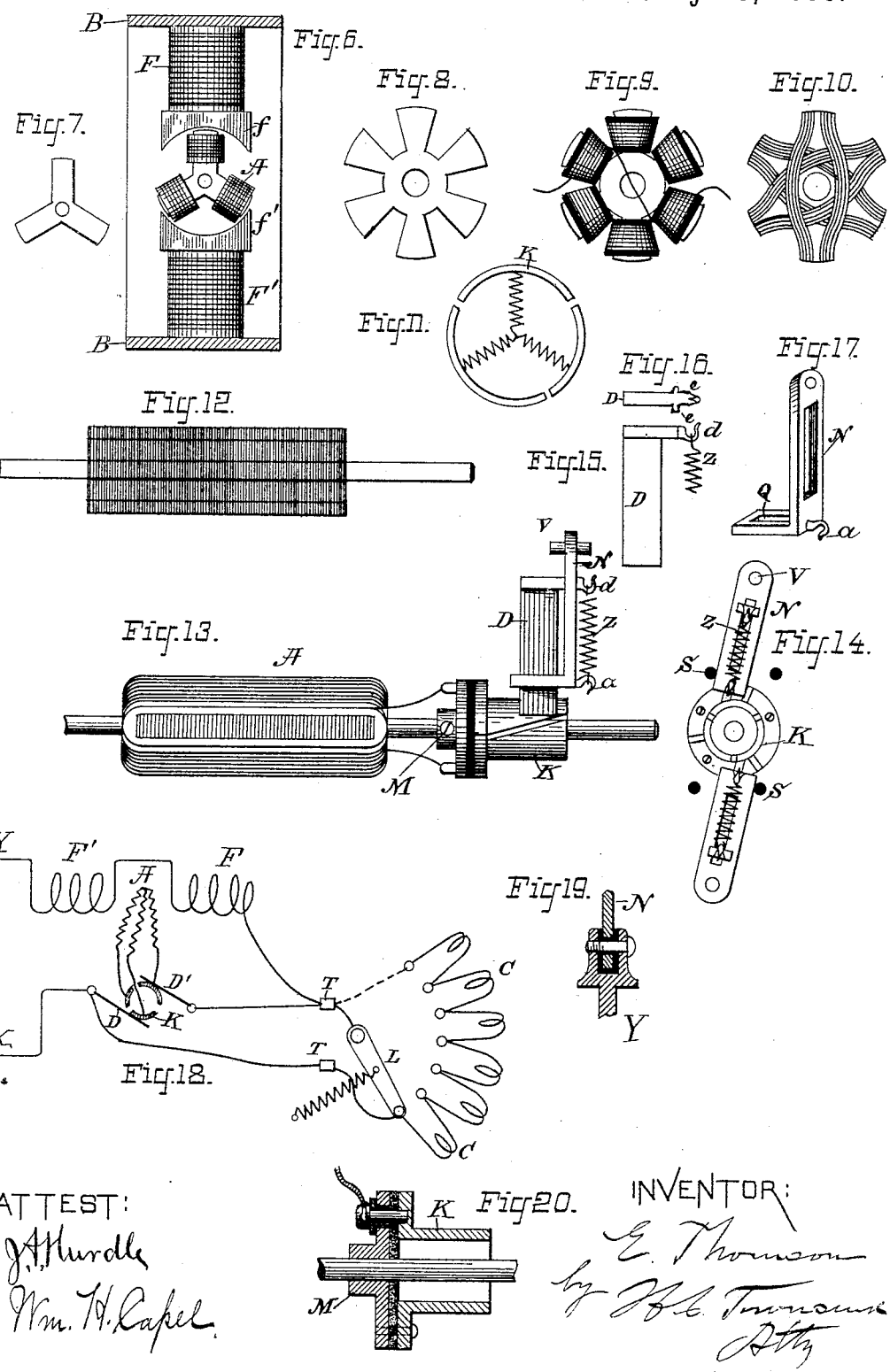

UNITED STATES PATENT OFFICE.

ELIHU THOMSON, OF LYNN, MASSACHUSETTS.

ELECTRO-MAGNETIC MOTOR.

SPECIFICATION forming part of Letters Patent No. 345,334, dated July 13, 1886.

Application filed September 21, 1885. Serial No. 177,762. (No model.)

*To all whom it may concern:*

Be it known that I, ELIHU THOMSON, a citizen of the United States, and a resident of Lynn, in the county of Essex and State of Massachusetts, have invented certain new and useful Improvements in Electro-Magnetic Motors, of which the following is a specification.

My present invention consists in certain novel dispositions of parts whereby small, efficient, convenient, and easily-constructed electric motors may be obtained with the advantage of compactness and reliability.

My invention relates particularly to the class of motors adapted to be operated in series upon lines carrying a current regulated or supplied so as to be constant in the mains under all conditions of working, although many features of its construction are adaptable to motors operated in multiple arc from mains of constant electric potential. I do not, however, limit myself to the employment of the motor in any particular system of electric supply. Many of the features of improvement are also obviously applicable when the motor is utilized as a generator.

Figure 1:
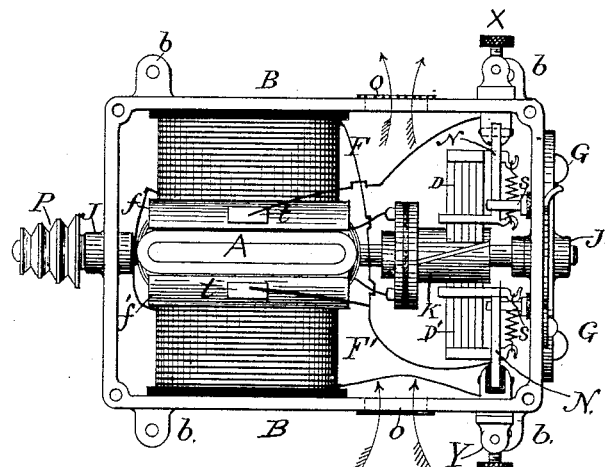
Figure 3:
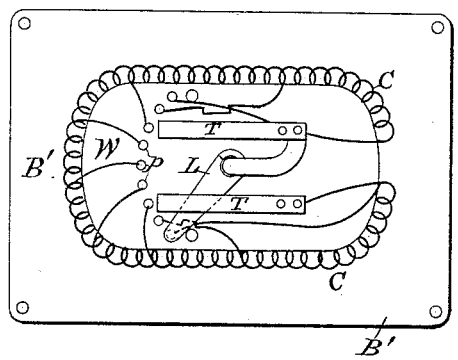
Figure 2:
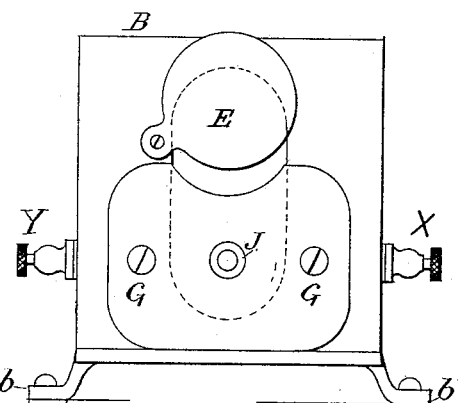
Figure 4:
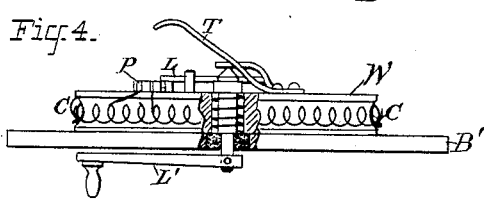
Figure 5:
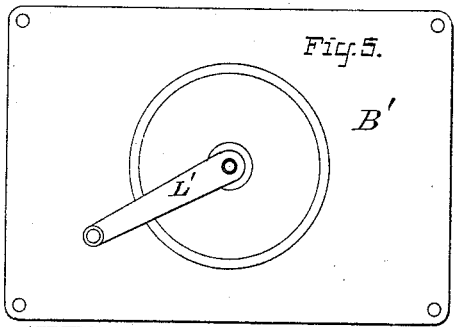

Figure 1 is a plan view showing the parts of the machine assembled. Fig. 2 is an end view of the motor-box; Fig. 3, a view of the variable resistance; Figs. 4 and 5, other views of the same. Figs. 6, 7, 8, 9, 10, 11, 12, and 13 illustrate the armature constructions employed. Fig. 14 illustrates the application of the commutator-brushes to the commutator. Figs. 15, 16, and 17 show the construction and arrangement of the commutator-brushes. Fig. 18 shows the circuit arrangement in the motor. Figs. 19 and 20 show details of other parts.

In Fig. 1, B B is a surrounding box or frame, cast-iron preferably, the lid of which has been removed to show the interior parts. The box B B supports or has formed in it the journals of the motor-shaft, as at J J, one end of which shaft bears a cone-pulley, P, as shown. Supported on the ends or sides of the box are two field-magnets and coils, F F', between the poles $ff'$ of which revolves the armature A, the construction of which latter is hereinafter described. The armature A revolves between the curved pole-faces $ff'$, arranged, as usual, with respect to the armature.

K is the commutator-cylinder. The commutator-brushes, bearing on the cylinder K, are indicated at D D', and are suitably supported, as hereinafter described, by extensions or hinged joints from the binding-posts X Y of the machine. Openings O O through the sides of the box B B, preferably covered with wire-gauze or wire-netting, permit the passage of air or circulation of air through the box to prevent the accumulation of heat. The box B B is preferably provided with feet $b\ b\ b\ b$, by which it may be attached to any suitable surface. The binding-posts X Y are insulated from the box B B in any suitable way, and the circuit-connections may be described as follows: From X the current passes to the brush D, in connection therewith to the commutator K through the coils of armature A, back to said commutator, out therefrom by the brush D', (which is, however, insulated from the binding-post Y,) a connection, as shown, and to one end of the coil F of the field-magnet, the other end of which is attached to the binding-post Y, from which the current returns to the feeding-circuit. The current is passed through the coils of F F', so as to produce in the poles $ff'$ facing the armature north and south polarity, respectively. The end of the box B opposite the pulley end is shown in Fig. 2. J is the journal-bearing for the armature, and is borne in a small plate, G G, detachable from the box B B by the removal of suitable screws. This plate G G serves to cover an opening in the box, which, when the said plate is removed, will permit the taking out of the armature-shaft, armature, and commutator after removal of the pulley P from the shaft. I find this a convenient disposition in arranging and adjusting the parts. A small swinging door, E, is used to cover the remainder of the opening in the box, or at other times to permit an inspection through such opening of the condition of the revolving commutator K, so that proper care can be exercised in the use of the machine. I prefer where the motor is used on higher potential lines, in series or in connection with electric-arc lights, to effect a ground-connection between the box B B, Fig. 2, at any point, and an earth-plate, H, or other connection to ground—such as a water or gas pipe—the object of which ground-connection is to prevent at any time its becoming a source of danger to persons touching the same, such persons being possibly grounded at the same time by simultaneously touching or coming in contact with a gas or water pipe or other ground-connection. With a ground-connection of B B established no such danger is present, as the box is already grounded and kept grounded. Where it is desirable to govern the amount of current which passes through the armature A, I apply a variable shunt around the armature through connections, respectively, from the two commutator-brushes D D' to a variable resistance, whose amount can be regulated at will, and by whose agency a derived circuit of greater or less resistance may be formed around the armature itself. This variable resistance might be used at any point where convenient, and connections there to be made; but I find for simplicity and compactness that it is preferable to arrange such resistance in the interior of the box, which also incloses the motor device. To this end the covering-lid of the box B B, (shown separately in Fig. 3, and marked B' B',) bears upon its inner surface a block of wood, W, or other insulator, around which is arranged a coil of German-silver wire, C C, which coil may be disposed in any suitable fashion; but, as shown, is let partly into a surrounding groove in the block W. From the coil C C, at various points, connections are taken to a series of pins, $p$, arranged in an arc of a circle, and over which a contact-arm, L, mounted on a central shaft or spindle, may be caused to pass by the rotation of a crank or lever, L', Figs. 4 and 5, located on the exterior surface of the box-lid. The parts L L' are borne on the central shaft, which is suitably insulated, and L' itself is made, preferably, of insulating material. Around the shaft between L and L', as shown in Fig. 4, is coiled a spiral spring, the tendency of which, by its elasticity and set, is to throw the arm or switch-piece L into the position it occupies in Fig. 3. In this position the coil C C is completely shunted, since one end of the coil is attached to a piece or bracket, in which one end of the spindle turns, and the other end of the coil is attached to the conducting-pin, upon which L bears when thrown open to its extreme limit by the aforesaid spring, it being held from passing further around by a suitable stop-pin at the extremity of the series of contact-pins $p$. There are also carried on the insulating-piece W W two spring conducting-pieces, T T, attached, respectively, to the ends of the coil C C, and bent as shown in Fig. 4, to effect contact with the insulated contact-pieces $t\,t$, Fig. 1, carried on the field-magnet poles $f\,f'$, or otherwise suitably supported and insulated from the other parts. The pieces $t\,t$ are respectively in connection with the commutator-brushes D D', so that when the lid B' B' is put into position to close or cover the parts exposed in Fig. 1, in the interior of the box B B, the contact-springs T T, Figs. 3 and 4, will bear upon the contact-surfaces $t\,t$ in such a manner that C C becomes a derived circuit or shunt around the armature A, inasmuch as the terminals of C C are in contact with the brushes D D, respectively. A motion of partial rotation being given by means of the crank or lever L' to the switch-piece L, which moves over the contact-pins $p$, the switch-piece can be made to successively throw in connection as a derived circuit around the armature any successive fractions of the coil C C up to its entire amount.

In Fig. 6 the armature A is shown in position between the poles $f\,f'$ of the field-magnets F F' in the box B B, the armature in this instance being composed of a central shaft, bearing three equidistant iron prongs or projections, on which the armature-coils, three in number, are carried.

Fig. 7 is an end view of the armature-core itself, consisting of three iron projections radiating from the center and adapted to receive coils slipped over them or wound upon them, the coils being three in number and having their same ends (inner or outer) connected together, and their remaining ends connected severally to the segments of the commutator.

Another form of armature with six projections is shown in Fig. 8, and upon which are wound coils, as shown in Fig. 9, six in number, but diametrically-opposite pairs of which are connected to form a single coil. The end section of the armature-core is as in Fig. 8. The winding might be as in Fig. 10—that is, three coils wound diametrically and parallel to the shaft in the intersecting planes. In any of these cases three coils are obtained with six free ends. These coils are connected into a three-coil armature—that is, one set of ends are connected together to form a common joint, and the other set of ends separately connected to the segments of the three-section commutator. This arrangement is typically illustrated in Fig. 11. It is preferable not to construct the armature-core and its prongs of a solid piece of metal, but to build it up of a large number of separate thin pieces, as indicated in Fig. 12, by stringing them in relatively the same position upon the shaft, so as to lie close together laterally until the proper length of armature-core is obtained. Other constructions are suitable and may be adopted; but the one indicated is preferable for simplicity.

In Fig. 13 the armature, wound as in Fig. 10, is shown as arranged upon the shaft with its commutator K, the commutator being formed of three segments, which, as indicated in Figs. 13, 14, and 20, are mounted upon a flanged collar, M, with set-screw carried upon the shaft and adjustable in position, the segments themselves being insulated from said collar and from each other by interposed insulation placed wherever needed to effect the result.

Connections are carried from the armature-coil terminals to the segments of the commutator, respectively, as indicated.

The brushes applied to the commutator consist of bundles of wire or bundles of sheets or laminæ of copper. The brushes are made self-feeding or self-adjusting during the action to avoid the necessity of constant attention.

The self-feeding action is accomplished in a novel manner at the same time that the contact position of the brush remains unchanged by wear. To accomplish this result I mount the brush in a sort of frame or guide, N, swinging upon a pivot, V, but stopped by suitable pins or stops, s, placed in the end of the box, Fig. 1, so as to prevent the pivoted frame N from swinging too far and allowing the brush D to slip by the commutator K. The brush D has attached to its rear end a hook-extension, d, passing through a slot in the carrier or swinging piece N, which is also provided with a hooked extension at a. Between the two hooked extensions so existing a stretched coiled spring is placed, so as to tend to draw them toward each other. The brush D passes through a rectangular slot, Q, in that part of frame N which is shown as turned at right angles to its main portion. (Seen in Fig. 17.) The shape of the hooked extension from D is seen on end in Fig. 16. The extension has small lateral projections e e, which prevent the said extension d from slipping back through the slot in N, in which it plays. The result of this arrangement is to accomplish the automatic feeding of the brush d forward as it wears on the commutator at the same time that its position remains undisturbed relatively to the neutral line or point of commutation in the armature. After the brush D is worn sufficiently, a new one may be inserted in a few moments by removing the old brush and inserting one similarly provided with a hooked extension, d; or, if desired, detaching the brush D from its hooked extension and fastening the said hooked extension to another brush by soldering or otherwise.

In Fig. 19 the insulation of the binding-post Y, Fig. 1, from the brush-carrier N, hinged thereto, is seen, consisting simply in the insertion of insulation in the joint between the two.

In Fig. 20 the commutator is shown, and the mode of mounting the segments and connecting the same to the leading-wire from the armature indicated, M being the flanged collar, between which and the commutator-segments secured thereto is a layer of insulating material, while the bolts by which the commutator-segments are secured are insulated from said flanged collar.

The circuit-connections are shown in Fig. 18 displayed in the form of a diagram, where F F' are the field-magnet coils; C C, the coils of the rheostat or resistance; L, the traveling arm for the contact-pins of the same; T T, the connections from the rheostat to the other parts of the apparatus; K, the commutator; D D', the brushes, and A the three armature-coils.

The relation and the operation of the various parts will be understood at a glance. When current passes from X to Y in the position shown in Fig. 18, the armature is shunted from T to T by L; but if the arm be thrown around, thus shunting the armature by successively greater resistance, the current passing through the armature A may be effectively controlled by the operation of the switch-arm L, and the motor may therefore be made to give out varying power and varying speed, as may be desired.

I designate the present invention, particularly as relating to its inclosure in a box, as the "box-motor."

What I claim as my invention is—

1. The combination, with an electric motor, of an inclosing iron box inclosing the field-magnets, the commutator and the armature, and provided with the screened ventilating-opening C C, the field-magnet for said machine being attached to the interior of said box and projecting inwardly therefrom, as and for the purpose described.

2. An inclosing-box for an electric motor, electrically connected with ground, as and for the purpose described.

3. An inclosing-box for an electric motor, provided with a movable end plate, whereby easy access may be had to the armature and commutator, and with a removable cap or cover, whereby the working of the commutator may be inspected from time to time.

4. In an electric motor, in combination with an inclosing-case, a field-magnet and armature inclosed therein, and commutator-connections, &c., also inclosed, and a variable resistance arranged to be inclosed with said motor in the case, substantially as described.

5. In an electric motor, a variable resistance mounted upon the lid of said motor, in combination with suitable spring-connections, T T', for making connection to the circuit when the parts are in place.

6. The combination, with an electric motor, of a variable rheostat consisting of coils C C and connecting-pins p, supported as shown, the traveling arm L, for connecting the same, the operating-handle L', the spring tending to throw said arm so as to shunt the armature, and connections to the commutator-brushes, substantially as described.

7. The combination, with the brush D, of a brush carrier, N, having a slot in its side through which a lateral extension from the brush passes, and an opening, Q, forming a guide for the end of the brush.

8. The combination of a swinging holder or brush-carrier, N, the limiting-stop S, and the spring-fed commutator-brush D, for the purpose specified.

9. The combination, with an electric motor, of a safety short circuit to ground, as and for the purpose described.

10. In an electric motor having a surrounding casing, a binding-post passing through the casing, but insulated therefrom, in combination with a swinging brush-holder pivoted from the inner end of the binding-post and bearing on the commutator of the machine, as and for the purpose described.

11. In an electric motor, an inclosing iron box having field-magnets attached to it and provided at one end with a covered opening, through which the armature-shaft may be withdrawn, as and for the purpose described.

12. In an electric motor, an inclosing iron box provided with an opening at one end covered by a removable plate carrying a journal-box of the armature, as and for the purpose described.

Signed at Lynn, in the county of Essex and State of Massachusetts, this 16th day of September, A. D. 1885.

ELIHU THOMSON.

Witnesses:
IVAN L. MELOON,
J. W. GIBBONY.